United States Patent
Bauer et al.

[11] Patent Number: 5,871,236
[45] Date of Patent: Feb. 16, 1999

[54] APPARATUS FOR PRETENSIONING SEAT BELT WEBBING

[75] Inventors: Barney J. Bauer, Fenton; Kevin M. Gillis, Shelby Township; Louis R. Brown, Oxford, all of Mich.

[73] Assignee: TRW Vehicle Safety Systems Inc., Lyndhurst, Ohio

[21] Appl. No.: 855,343

[22] Filed: May 13, 1997

[51] Int. Cl.[6] .......................... B60R 22/46; B60R 22/48
[52] U.S. Cl. ........................ 280/806; 280/739; 297/480
[58] Field of Search .................... 280/806, 735, 280/736, 739; 242/374; 297/480; 180/273, 268

[56] References Cited

U.S. PATENT DOCUMENTS

| | | | |
|---|---|---|---|
| 5,071,160 | 12/1991 | White et al. | 280/735 |
| 5,398,185 | 3/1995 | Omura | 280/735 |
| 5,407,148 | 4/1995 | Ono et al. | 242/374 |
| 5,413,378 | 5/1995 | Steffens, Jr. et al. | 280/735 |
| 5,415,431 | 5/1995 | Omura | 280/806 |
| 5,450,723 | 9/1995 | Fohl | 280/806 |
| 5,496,068 | 3/1996 | Ball et al. | 280/806 |
| 5,615,917 | 4/1997 | Bauer | 280/806 |
| 5,664,802 | 9/1997 | Harris et al. | 280/736 |
| 5,695,214 | 12/1997 | Faigle et al. | 280/735 |

*Primary Examiner*—Peter C. English
*Attorney, Agent, or Firm*—Tarolli, Sundheim, Covell, Tummino & Szabo

[57] ABSTRACT

An apparatus (40) for pretensioning seat belt webbing (16) which is extensible about an occupant of a vehicle seat (14) includes a housing (70) having a fluid chamber (90) and an actuatable pyrotechnic device (150) in fluid communication with the fluid chamber. An actuatable venting mechanism, such as a pyrotechnic plug (160), when actuated, opens a vent opening (96) to enable venting of fluid from the fluid chamber (90). A controller (190) is operatively connected to the pyrotechnic device (150) and to the venting mechanism (160) for controlling the actuation of the pyrotechnic device and of the venting mechanism. The controller (190) actuates only the pyrotechnic device (150) to provide a first pretensioning output level and, alternatively, actuates both the pyrotechnic device (150) and the venting mechanism (160) to provide a second pretensioning output level.

19 Claims, 3 Drawing Sheets

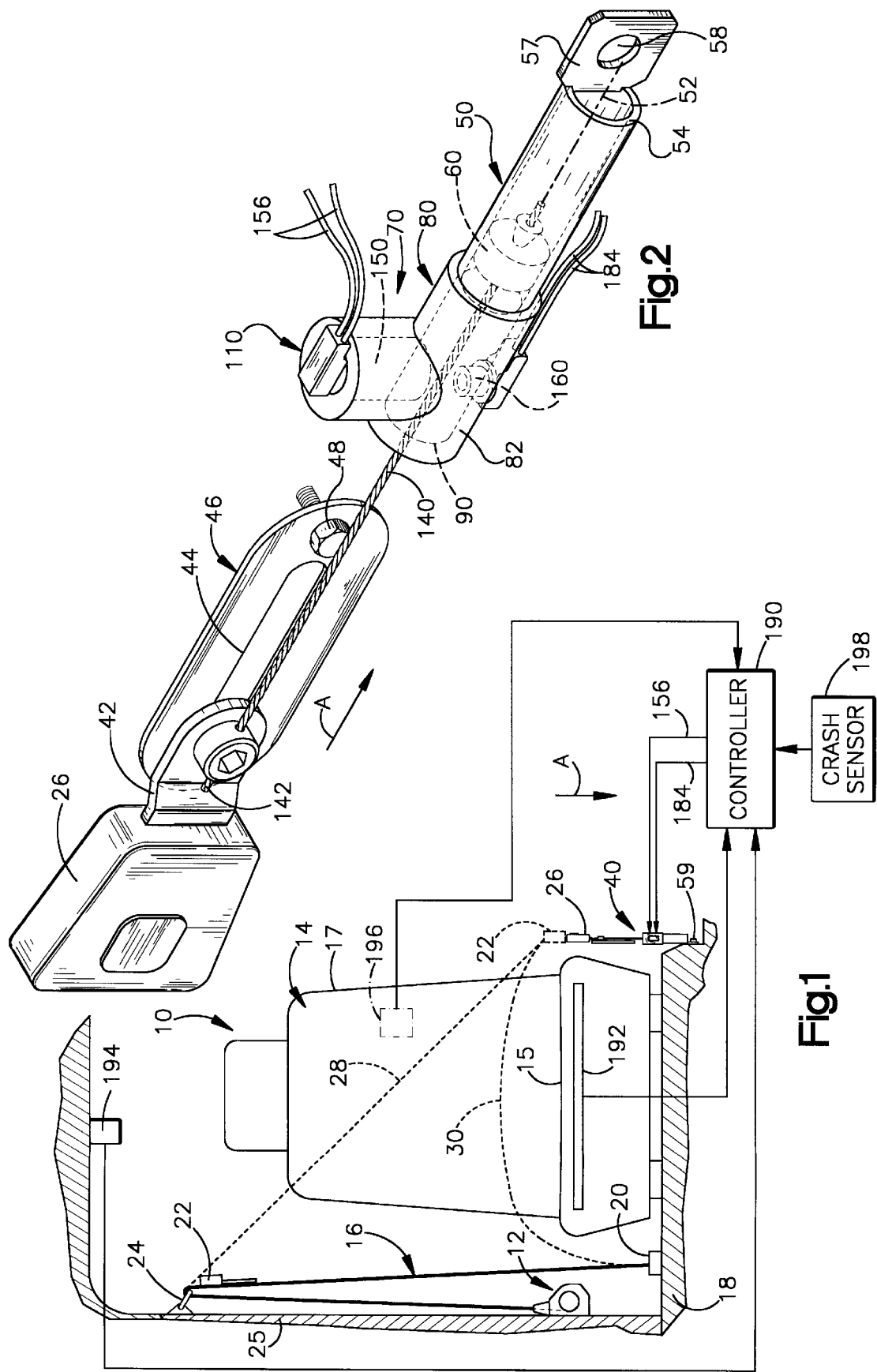

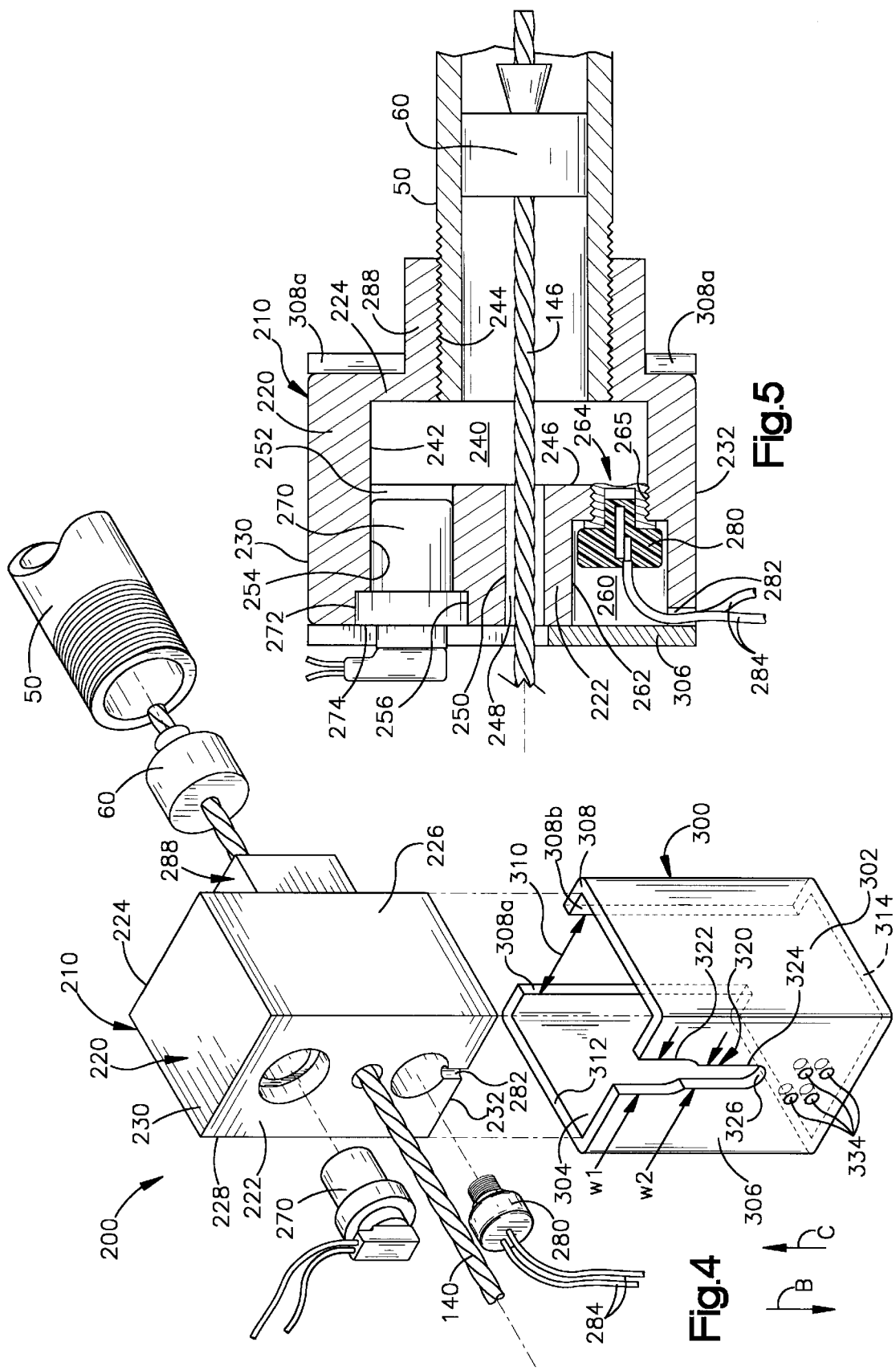

APPARATUS FOR PRETENSIONING SEAT BELT WEBBING

BACKGROUND OF THE INVENTION

1. Technical Field

The present invention relates to an apparatus for helping to protect a vehicle occupant. In particular, the present invention relates to a seat belt webbing pretensioner apparatus which has multiple pretensioning output levels, one of which levels is provided by venting fluid pressure from the pretensioner apparatus.

2. Description of the Prior Art

A typical vehicle seat belt system includes a length of seat belt webbing wound on a spool of a seat belt webbing retractor. The seat belt webbing is extensible about a vehicle occupant to help protect the occupant. The spool rotates in a belt webbing withdrawal direction as the seat belt webbing is withdrawn from the retractor. In the event of a vehicle collision, the spool is prevented from rotating in the belt webbing withdrawal direction.

It is known to pretension, or remove any slack in, the seat belt webbing in the event of a collision. In one known seat belt webbing system, the seat belt webbing is pretensioned by moving a buckle associated with the seat belt webbing through a pretensioning stroke. The force of the pretensioning stroke is typically large enough so that, for an average male occupant, any slack in the seat belt webbing is removed. A variety of pretensioning force levels may be desirable to uniformly restrain all sizes of occupants.

SUMMARY OF THE INVENTION

The present invention is an apparatus for pretensioning seat belt webbing which is extensible about an occupant of a vehicle seat. The apparatus comprises a housing having a fluid chamber and an actuatable pyrotechnic charge in fluid communication with the fluid chamber. Actuatable means is provided for, when actuated, venting fluid from the fluid chamber. Controlling means, which is operatively connected to the pyrotechnic charge and to the means for venting, is provided for controlling the actuation of the pyrotechnic charge and of the means for venting. The controlling means actuates only the pyrotechnic charge to provide a first pretensioning output level. The controlling means alternatively actuates both the pyrotechnic charge and the means for venting to provide a second pretensioning output level.

The first and second pretensioning output levels correspond to respective levels of pretensioning force applied to the seat belt webbing which in turn correspond to respective levels of pretensioning force imposed on the occupant by the seat belt webbing.

The means for venting comprises an actuatable pyrotechnic plug in fluid communication with the fluid chamber. The housing has a vent opening in fluid communication with the fluid chamber. The pyrotechnic plug, when unactuated, closes the vent opening.

The apparatus further includes a piston movable in a cylinder. The housing is attached to the cylinder. The piston is initially disposed adjacent the fluid chamber in the housing and is coupled to the seat belt webbing by a coupling member. The coupling member transmits movement of the piston into movement of the seat belt webbing to pretension the seat belt webbing in the event of a vehicle collision.

According to one feature of the present invention, the apparatus comprises sensing means for sensing at least one characteristic of an occupant of the vehicle seat. The sensing means is electrically connected to the controlling means and provides a signal to the controlling means indicative of the at least one characteristic of the occupant.

In accordance with another feature of the present invention, the sensing means includes means for sensing the weight of the occupant, means for sensing the height of the occupant, and means for sensing the position of the occupant in the vehicle seat. The controlling means is operable to (i) receive signals from the sensing means indicative of the weight, the height and the position of the occupant, (ii) determine which of the first and second pretensioning output levels is appropriate for the occupant, and (iii) actuate at least one of the pyrotechnic charge and the means for venting in accordance with the determined appropriate pretensioning output level.

According to a second embodiment of the present invention, the housing includes a vent chamber. The vent chamber is connected in fluid communication with the fluid chamber in the housing by a vent opening. A diffuser member is attached to the housing and covers portions of the housing. The diffuser member has a plurality of diffuser openings which overlie the vent chamber.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system including an apparatus for pretensioning seat belt webbing constructed in accordance with the present invention;

FIG. 2 is a perspective view of a portion of the pretensioner apparatus of FIG. 1;

FIG. 4 is an exploded perspective view of a pretensioner apparatus constructed in accordance with a second embodiment of the present invention; and FIG. 5 is a sectional view of a portion of the pretensioner apparatus of FIG. 4.

DESCRIPTION OF PREFERRED EMBODIMENTS

Figure 3:
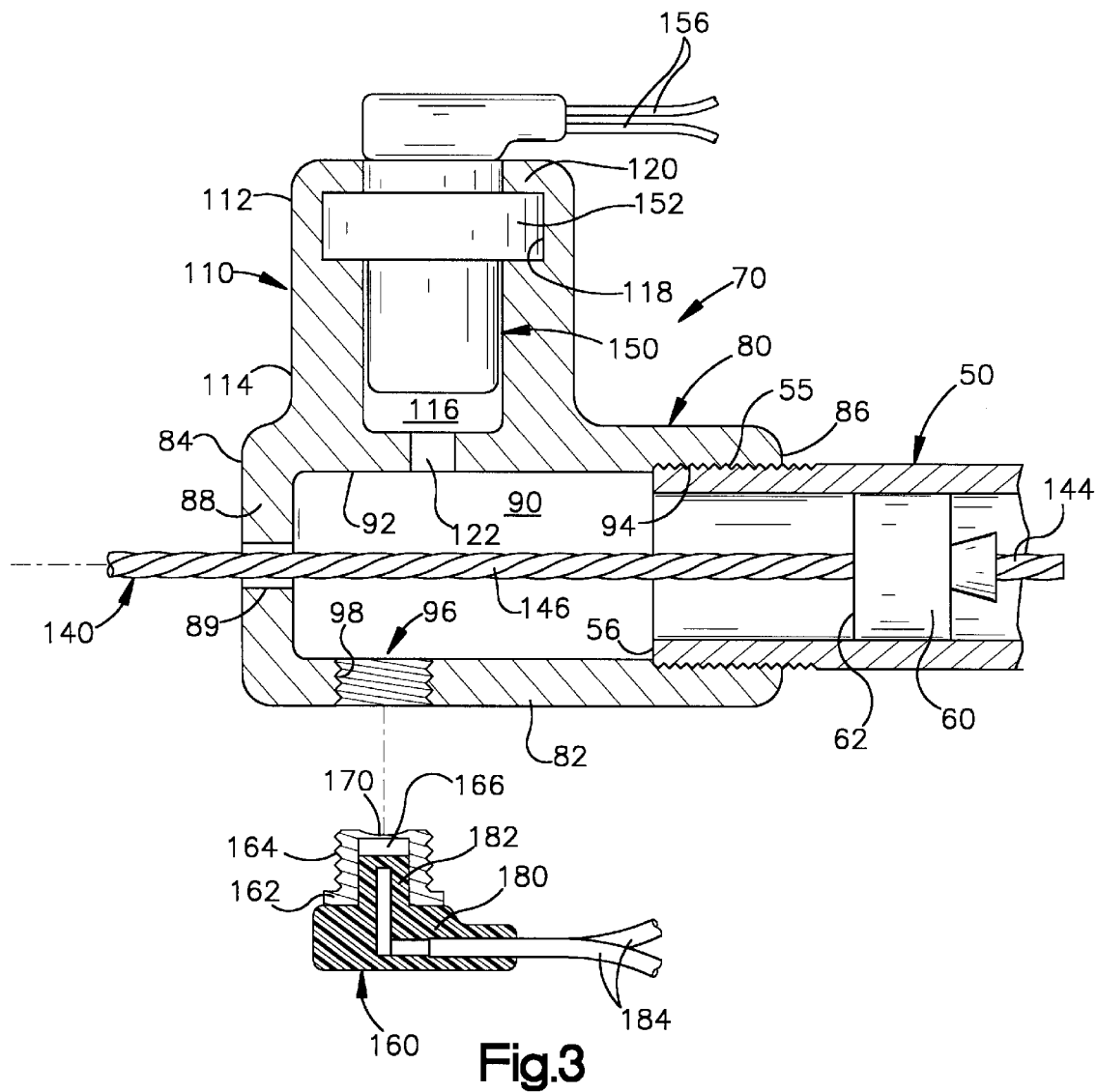
FIG. 3 is a partially exploded sectional view of a portion of the pretensioner apparatus shown in FIG. 2.

The present invention relates to a vehicle seat belt system for helping to protect an occupant of a vehicle. The present invention is particularly directed to a pretensioner apparatus which has multiple pretensioning output levels, one of which levels is provided by venting fluid pressure from the pretensioner apparatus. The present invention is applicable to various seat belt system constructions. As representative of the present invention, FIG. 1 illustrates a three-point continuous loop seat belt system 10 for use in restraining an occupant of a vehicle.

During operation of the vehicle, the occupant of the vehicle sits on a vehicle seat 14 which is illustrated as a front passenger seat in the vehicle. The vehicle seat 14 has a seat bottom cushion 15 and a seat back 17. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 12 which is secured to the vehicle body 18 on the same side of the seat 14. Intermediate its ends, the belt webbing 16 passes through a tongue assembly 22 and a D-ring 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

A pretensioner apparatus 40 is provided which is operable to remove slack from the seat belt webbing 16 in the event of sudden vehicle deceleration such as occurs in a vehicle collision. The pretensioner apparatus 40 (FIG. 2) includes a slide 42 which is fixedly connected to the buckle 26. The slide 42 is movable along a longitudinal slot 44 in an anchor plate 46. The anchor plate 46 is secured to the vehicle body 18 by a bolt 48.

The pretensioner apparatus 40 further includes a cylinder 50, a piston 60 in the cylinder, and a housing 70 attached to the cylinder. The cylinder 50 has an axial centerline 52, a first end 56 (FIG. 3), and a second end 54 (FIG. 2). An outer surface 55 (FIG. 3) of the cylinder 50 adjacent the first end 56 is threaded. A planar mounting flange 57 extends from the second end 54 of the cylinder 50. The mounting flange 57 has a centrally located opening 58 for receiving a bolt 59 (FIG. 1) to secure the cylinder 50 to the vehicle body 18. The cylinder 50 is shown oriented vertically in FIG. 1, but the cylinder could be oriented horizontally or at an angle between horizontal and vertical.

The piston 60 is movable in the cylinder 50 between a first position adjacent the first end 56 of the cylinder and a second position adjacent the second end 54 of the cylinder. A pressure side 62 (FIG. 3) of the piston 60 faces the first end 56 of the cylinder 50.

The housing 70 has an L-shaped configuration including a cylindrical base portion 80 and a cylindrical boss 110 which extends at a right angle to the base portion 80. The base portion 80 (FIG. 3) has a side wall 82 and first and second axial ends 84 and 86, respectively. A radially extending end wall 88 is located at the first axial end 84 of the base portion 80. A small diameter cable opening 89 is formed in the end wall 88. The second axial end 86 of the base portion 80 is open.

A cylindrical fluid chamber 90 in the base portion 80 is defined in part by a cylindrical surface 92 which extends axially between the end wall 88 and the second axial end 86. A threaded portion 94 of the base member 80 receives the threaded portion 55 of the cylinder 50 inside the housing 70. Adjacent the end wall 88 of the base portion 80, a vent opening 96 extends radially through the side wall 82 of the base portion 80 of the housing 70. The vent opening 96 is defined by a threaded surface 98.

The boss 110 is located diametrically opposite the vent opening 96 in the base portion 80. The boss 110 has first and second end portions 112 and 114, respectively. A combustion chamber 116 is defined inside the boss 110. The first end portion 112 of the boss 110 includes an annular groove 118 which is defined in part by a crimpable flange 120. A combustion opening 122 in the second end portion 114 of the boss 110 provides fluid communication between the combustion chamber 116 in the boss and the fluid chamber 90 in the base portion 80.

A cable 140 couples the slide 42 for movement with the piston 60. A first end portion 142 (FIG. 2) of the cable 140 is connected to the slide 42 and a second end portion 144 (FIG. 3) of the cable is connected to the piston 60. The cable 140 extends through the cable opening 89 in the end wall 88 of the base portion 80 and through the portion 55 of the cylinder 50 which extends inside the housing base portion 80. An intermediate portion 146 of the cable 140 is disposed in the fluid chamber 90 in the base portion 80 of the housing 70.

Under normal driving conditions, the slide 42 (FIG. 2) connected to the seat belt buckle 26 is frictionally held in an upper portion of the slot 44 in the anchor plate 46. The piston 60 is in its first position in the cylinder 50 adjacent the first end 56 of the cylinder. The cable 140 which interconnects the piston 60 and the slide 42 is taut.

The pretensioner apparatus 40 includes a pyrotechnic device 150 located in the combustion chamber 116 in the boss 110 of the housing 70. The pyrotechnic device 150 has an annular ridge 152 which is received in the annular groove 118 in the boss 110. The flange 120 of the boss 110 is crimped over the ridge 152 of the pyrotechnic device 150 to secure the pyrotechnic device to the boss. The pyrotechnic device 150 includes a material which, when actuated by a flow of electric current, ignites and combusts to increase the pressure in the combustion chamber 116. The pyrotechnic device 150 is electrically actuatable over lead wires 156.

The pretensioner apparatus 40 further includes an actuatable pyrotechnic plug 160 which closes the vent opening 96 in the housing 70. The pyrotechnic plug 160 includes a frangible insert 162 and a detonator 180. A threaded portion 164 of the insert 162 is screwed into the vent opening 96 in the side wall 82 of the base portion 80. A cylindrical channel 166 extends through the insert 162 and is closed at one end by a rupturable wall 170.

A portion 182 of the detonator 180 is received in the channel 166 with an interference fit. The detonator 180 includes a material which is electrically actuatable over lead wires 184. If the detonator 180 is actuated as described below, the vent opening 96 is opened and fluid can flow out of the chamber 90 through the vent opening.

The pretensioner apparatus 40 (FIG. 1) includes a system controller 190 mounted in the vehicle. The system controller 190 is electrically connected to the pyrotechnic charge 150 by the lead wires 156 and to the pyrotechnic plug 160 by the lead wires 184. The system controller 190 preferably comprises a microcomputer or microprocessor.

The pretensioner apparatus 40 further includes a plurality of sensors for sensing characteristics of an occupant of the vehicle seat 14. The plurality of sensors includes a weight sensor 192 (FIG. 1), a height sensor 194, and a position sensor 196. The signals from the sensors 192, 194, and 196 are continuously transmitted to the system controller 190, which continuously stores the signals received from each of the sensors in an internal memory of the system controller.

The weight sensor 192 is located in the seat bottom cushion 15 of the vehicle seat 14 and is electrically connected to the system controller 190. The weight sensor 192 senses the weight of the occupant of the vehicle seat 14 and sends a signal to the controller 190 indicative of the sensed weight.

The height sensor 194 is mounted to the roof of the vehicle and is electrically connected to the system controller 190. The height sensor 194 may be an ultrasonic sensor, an infrared sensor, or another type of sensor. The height sensor 194 senses the height of the occupant of the vehicle seat 14 and sends a signal to the system controller 190 indicative of the sensed height. The height sensor 194 could, alternatively, be located in another part of the vehicle such as the vehicle instrument panel, the B-pillar 25, the seat back 17, or the vehicle door.

The position sensor 196 is located in the vehicle instrument panel (not shown) and is electrically connected to the system controller 190. The position sensor 196 may be an ultrasonic sensor, an infrared sensor, or another type of sensor. The position sensor 196 senses the position of the occupant in the vehicle seat 14 and sends a signal to the system controller 190 indicative of the sensed position. The position sensor 196 could, alternatively, be located in another part of the vehicle such as the B-pillar 25, the vehicle door, or the seat back 17.

A crash sensor 198 mounted on the vehicle body 18 is also electrically connected to the system controller 190. The crash sensor 198 senses conditions indicative of a vehicle collision, such as sudden vehicle deceleration.

In the event of sudden vehicle deceleration such as occurs in a collision, the crash sensor 198 sends a collision detection signal to the system controller 190. The pyrotechnic charge 150 is actuated by an electric signal from the system controller 190 over the lead wire 156. The pyrotechnic plug 160 may also be actuated by the system controller 190, as described below in detail.

When the pyrotechnic device 150 is actuated, the resulting combustion products of the pyrotechnic device rapidly produce a significant increase in pressure inside the combustion chamber 116 in the boss 110 of the housing 70. Because the fluid chamber 90 in the housing 70 is connected to the combustion chamber 116 by the combustion opening 122, the fluid pressure inside the fluid chamber 90 also increases. The increased fluid pressure in the fluid chamber 90 applies force against the pressure side 62 of the piston 60 and causes the piston to move inside the cylinder 50 from its first position adjacent the first end 56 of the cylinder to its second position adjacent the second end 54 of the cylinder.

As the piston 60 moves in the cylinder 50, the cable 140 is pulled along with the piston. This pulling of the cable 140 causes the slide 42, to which the cable is connected, to be pulled downward in the slot 44 in the anchor plate 46, in the direction indicated by the arrow A (FIGS. 1 and 2). The downward movement of the slide 42 pulls the seat belt buckle 26 and the tongue assembly 22 downward, thus tightening the seat belt webbing 16 and removing slack in the seat belt webbing 16. After the pretensioning action is completed, the tongue 22, the buckle 26, and the cable 140 are secured in their displaced position by a known clutch mechanism that is attached to the piston 60.

As noted above, the system controller 190 may actuate the pyrotechnic plug 160 in addition to the pyrotechnic device 150, in order to provide a second, lower, output level of the pretensioner 40. Specifically, at all times prior to the receipt of a collision detection signal from the crash sensor 198, the system controller 190 analyzes the signals from the sensors 192, 194, and 196 to determine whether, in the event of a vehicle collision, only the pyrotechnic charge 150 should be actuated or whether both the pyrotechnic charge 150 and the pyrotechnic plug 160 should be actuated. The system controller 190 continuously performs this decision process and thus is always ready to actuate the pyrotechnic charge 150 and possibly the pyrotechnic plug 160 according to the specific sensed characteristics of the occupant.

For example, if the weight sensor 192 has most recently provided the system controller 190 with information that the occupant of the seat 14 is relatively heavy, then the system controller may decide, on the basis of its internal programming, that a first (or higher) output level of the pretensioner apparatus 40 is necessary. In this case, only the pyrotechnic device 150 is actuated. The pressure in the combustion chamber 116 and the fluid chamber 90 is increased to a first level. This first level of pressure acts on the piston 60 with a first amount of force, and a first pretensioning output level for the pretensioner apparatus 40 is realized. This first output level is appropriate for the relatively heavy occupant the weight controller has indicated is present in the vehicle seat 14.

On the other hand, if the weight sensor 192 has most recently provided the system controller 190 with information that the occupant of the seat 14 is relatively light, then the system controller may decide, on the basis of its internal programming, that a second (or lower) output level of the pretensioner apparatus 40 is preferable. In this case, the pyrotechnic plug 160 is actuated along with the pyrotechnic charge 150. When the pyrotechnic plug 160 is actuated, the combustion of the detonator 180 ruptures the rupturable wall 170 of the insert 162, thereby opening the vent opening 96. Fluid pressure in the fluid chamber 90 is vented through the vent opening 96.

The pressure in the fluid chamber 90 rises to a second, or lower, level because the vent opening 96 is open. This second (or lower) level of pressure acts on the piston 60 with a second amount of force, lower than the first amount of force described above with reference to the actuation of only the pyrotechnic device 150. A second (or lower) pretensioning output level for the pretensioner apparatus 40 is realized and, consequently, less force is applied to the seat belt webbing 16. This second (or lower) output level can be more appropriate for the relatively light occupant the weight sensor 192 has indicated is present in the vehicle seat 14.

Another example of the decision process made by the system controller 190 involves the height sensor 194. If the height sensor 194 provides the system controller 190 with information that the occupant of the seat 14 is relatively tall (indicative of the presence of an average adult in the seat), the system controller may decide that the higher output level of the pretensioner 40 is necessary. In this case, only the pyrotechnic device 150 is actuated. Conversely, if the height sensor 194 provides the system controller 190 with information that the occupant of the seat 14 is relatively short (indicative of the presence of a small adult or large child in the seat), the system controller may decide that the lower pretensioner output level is preferable and actuate the pyrotechnic plug 160.

A further example of the decision process made by the system controller 190 involves the position sensor 196. If the position sensor 196 provides the system controller 190 with information that the occupant of the seat 14 is out-of-position in the seat (for example, leaning forward), the system controller may decide that a higher pretensioner output level is necessary in order remove slack and more firmly restrain the occupant. Conversely, if the position sensor 196 provides the system controller 190 with information that the occupant of the seat 14 is properly seated in the seat, the system controller may decide that the lower output level for the pretensioner is preferable in order simply to remove any slack in the seat belt webbing 16.

The decision of whether to actuate either the pyrotechnic charge 150 only or both the pyrotechnic charge and the pyrotechnic plug 160 can be made on the basis of the sensed characteristics received from any one of the sensors 192, 194 and 196. That is, the system controller 190 can consider any one characteristic of the occupant as controlling and determine, on the basis of that one factor, the appropriate output level for the pretensioner apparatus 40. Alternatively, the system controller 190 can consider more than one characteristic of the occupant and then determine, on the basis of all the factors considered, the appropriate output level for the pretensioner apparatus 40.

It should be apparent from the foregoing that there is a direct correlation between the force due to the pressure inside the fluid chamber 90 in the housing, 70 and the pretensioning force which is imposed on the occupant by the seat belt webbing 16. When only the pyrotechnic charge 150 is actuated, a relatively large increase in pressure occurs in the chamber 90, and a relatively high level of pretensioning force is applied to the cable 140 and, thus, to the belt webbing 16. When both the pyrotechnic charge 150 and the pyrotechnic plug 160 are actuated, a smaller increase in pressure occurs in the fluid chamber 90 and, thus, a relatively lower level of pretensioning force is applied to the belt webbing 16.

FIGS. 4 and 5 illustrate a pretensioner apparatus 200 in accordance with a second embodiment of the present invention. In FIGS. 4 and 5, reference numbers identical to those of the embodiment of FIGS. 1–3 are used to designate parts which are identical to the parts of the embodiment of FIGS. 1–3.

The pretensioner apparatus 200 (FIGS. 4 and 5) includes a cylinder 50, a piston 60 in the cylinder, and a housing 210. The housing 210 includes a rectangular base portion 220 having parallel first and second axial end walls 222 and 224 and parallel first and second side walls 226 and 228. The base portion 220 also has parallel top and bottom walls 230 and 232, respectively. A rectangular projecting portion 288 of the housing 210 is smaller than the base portion 220 and projects axially from the second axial end wall 224 of the base portion.

A cylindrical fluid chamber 240 (FIG. 5) in the housing 210 is defined in part by first and second axially extending surfaces 242 and 244. The second axially extending surface 244 is threaded and extends through part of the base portion 220 and through all of the projecting portion 288 of the housing 210. A radially extending surface 246 on the end wall 222 further partially defines the fluid chamber 240. A cable passage 248, which is defined by a third axially extending surface 250, extends from the radial surface 246 through the first axial end wall 222.

The base portion 220 of the housing 210 includes a cylindrical combustion chamber 252 which is defined by a fourth axially extending surface 254 in the end wall 222. The combustion chamber 252 is in fluid communication, at one end, with the fluid chamber 240. A counterbore 256 is located at the mouth or opposite end of the combustion chamber 252.

A cylindrical vent chamber 260 is defined in the end wall 222 of the housing 210 by a fifth axially extending surface 262. The vent chamber 260 is connected in fluid communication with the fluid chamber 240 by a vent opening 264 defined by a sixth axially extending surface 265.

A pyrotechnic device 270 is disposed in the combustion chamber 252. An annular flange 272 on the pyrotechnic device 270 is received in the counterbore 256. A pyrotechnic plug 280 is disposed in the vent opening 264. A groove 282 (FIG. 4) in the end wall 222 of the housing 210 receives lead wires 284 for the pyrotechnic plug.

The pretensioner apparatus 200 includes a diffuser member or diffuser 300 (FIG. 4) which is a stamped metal part formed into a substantially square tubular shape. The diffuser 300 has parallel first and second side walls 302 and 304, respectively, and parallel first and second end walls 306 and 308, respectively. The second end wall 308 of the diffuser 300 is split into two portions 308a and 308b separated by a gap 310. An upper edge 312 of the diffuser 300 defines an open top for the diffuser. A lower edge 314 defines an open bottom for the diffuser 300.

The first end wall 306 of the diffuser 300 includes a slot 320 which extends downward in the direction of the arrow B (FIG. 4) from the upper edge 312. The slot 320 has a first section 322 extending from the upper edge 312 of the diffuser 300. The first section 322 of the slot 320 has a first width W1. A second section 324 of the slot 320 extends downward from the first section 322 and has a second width W2 which is less than the first width W1.

The first end wall 306 of the diffuser 300 includes four diffuser openings 334 located between a terminal end 326 of the slot 320 and the lower edge 314 of the diffuser. The four diffuser openings 334 are arranged in a square pattern, but could be arranged in another pattern. A different number of diffuser openings 334 could alternatively be provided, for example, in the range of from three to ten openings.

The dimensions of the diffuser 300 are selected so that the diffuser slides over the housing 210 in the direction of the arrow C (FIG. 4) with an interference fit. The first and second end walls 306 and 308 of the diffuser 300 overlie the first and second end walls 222 and 224 of the base portion 220 of the housing 210. The first and second side walls 302 and 304 of the diffuser 300 overlie the first and second side walls 226 and 228 of the base portion 220 of the housing 210. The projecting portion 288 of the housing 210 fits into the gap 310 between the two portions 308a and 308b of the second end wall 308 of the diffuser 300.

A portion of the cable 140 extends through the second section 324 of the slot 320 in the first end wall 306 of the diffuser 300. A portion of the pyrotechnic device 270 fits into the first section 322 of the slot 320. An outwardly facing surface 274 of the pyrotechnic device 270 is engaged by the first end wall 306 of the diffuser 300 to retain the pyrotechnic device in the housing 210.

The operation of the pretensioner apparatus 200 is substantially similar to the operation of the pretensioner apparatus 40 of the first embodiment, with one exception. In the pretensioner apparatus 200, when both the pyrotechnic device 270 and the pyrotechnic plug 280 are actuated and, thus, the vent opening 264 is opened, the portion of the hot combustion products from the pyrotechnic device which is vented from the housing 210 flows through the vent chamber 260 before exiting the housing. In the vent chamber 260, the hot combustion products are at least partially cooled. The combustion products then flow through the diffuser openings 334 in the diffuser 300 and are further cooled and diffused prior to being expelled into the ambient air in the vehicle. This cooling and diffusion of the combustion products can help to prevent damage to vehicle components which might be caused by the elevated temperature of the combustion products being vented from the housing 210.

From the above description of the invention, those skilled in the art will perceive improvements, changes and modifications in the invention. For example, a seat belt buckle sensor could be added to the pretensioner apparatus to indicate whether or not the seat belt is buckled, so that the system controller, may decide, based on its internal programming, not to actuate the pyrotechnic device if the seat belt is not being worn by the vehicle occupant. Also, the system controller could be configured so that if it does not receive a signal from one or more of the sensors, thus indicating that the seat is not occupied, the system controller may decide, based on its internal programming, not to actuate the pyrotechnic device. Further, an additional pyrotechnic plug could be incorporated into the pretensioner apparatus to provide a third pretensioning output level by venting additional fluid pressure. Further, the apparatus can also be applied to a retractor or anchorage-type pretensioning system. Such improvements, changes and modifications within the skill in the art are intended to be covered by the appended claims.

Having described the invention, we claim:

1. An apparatus for pretensioning seat belt webbing which is extensible about an occupant of a seat in a vehicle, said apparatus comprising:

a cylinder having a first end and a second end;

a housing attached to said first end of said cylinder, said housing having a fluid chamber and a vent opening in fluid communication with said fluid chamber;

a piston in said cylinder and in fluid communication with said fluid chamber, said piston being movable from a first position adjacent said first end of said cylinder to a second position adjacent said second end of said cylinder;

coupling means for coupling said piston to the seat belt webbing, a portion of said coupling means extending through said fluid chamber, said coupling means transmitting movement of said piston into movement of the seat belt webbing to pretension the seat belt webbing in the event of a vehicle collision;

an actuatable pyrotechnic device connected with said housing and in fluid communication with said fluid chamber, said pyrotechnic device being actuatable to increase the pressure in said fluid chamber, the actuation of said pyrotechnic device corresponding to a first pretensioning output level and causing said piston to move from said first position in said cylinder to said second position;

an actuatable pyrotechnic plug which closes said vent opening in said housing and which is in fluid communication with said fluid chamber, said pyrotechnic plug being actuatable to open said vent opening and vent pressure from said fluid chamber, the actuation of said pyrotechnic device and said pyrotechnic plug corresponding to a second pretensioning output level and causing said piston to move from said first position in said cylinder to said second position, said second pretensioning output level being lower than said first pretensioning output level; and controlling means operatively connected to said pyrotechnic device and to said pyrotechnic plug for controlling the actuation of said pyrotechnic device and of said pyrotechnic plug.

2. The apparatus as set forth in claim 1 wherein said first and second pretensioning output levels correspond to respective first and second levels of pretensioning force applied to the seat belt webbing which in turn correspond to respective first and second levels of pretensioning force imposed on the occupant by the seat belt webbing.

3. The apparatus as set forth in claim 1 further comprising sensing means for sensing at least one characteristic of an occupant of the vehicle seat, said sensing means being electrically connected to said controlling means and providing a signal to said controlling means indicative of said at least one characteristic of the occupant.

4. The apparatus as set forth in claim 3 wherein said sensing means includes means for sensing the weight of the occupant, means for sensing the height of the occupant, and means for sensing the position of the occupant in the vehicle seat;

said controlling means being operable to (i) receive signals from said sensing means indicative of the weight, the height and the position of the occupant, (ii) determine which of said first and second pretensioning output levels is appropriate for the occupant, and (iii) actuate at least one of said pyrotechnic device and said pyrotechnic plug in accordance with the determined appropriate pretensioning output level.

5. The apparatus as set forth in claim 1 wherein said housing includes a vent chamber, said vent chamber being connected in fluid communication with said fluid chamber in said housing by said vent opening.

6. The apparatus as set forth in claim 5 further comprising a diffuser member attached to said housing and covering portions of said housing, said diffuser member having a plurality of diffuser openings which overlie said vent chamber.

7. An apparatus for pretensioning seat belt webbing which is extensible about an occupant of a vehicle seat, said apparatus comprising:

a housing having a fluid chamber;

means for tensioning the seat belt webbing in response to pressure in the fluid chamber;

an actuatable pyrotechnic device in fluid communication with said fluid chamber;

actuatable venting means for, when actuated, venting fluid from said fluid chamber; and controlling means operatively connected to said pyrotechnic device and to said means for venting for controlling the actuation of said pyrotechnic device and of said means for venting, said controlling means actuating only said pyrotechnic device to provide a first pretensioning output level, said controlling means actuating both said pyrotechnic device and said means for venting to provide a second pretensioning output level.

8. The apparatus as set forth in claim 7 wherein said first and second pretensioning output levels correspond to respective first and second levels of pretensioning force applied to the seat belt webbing which in turn correspond to respective first and second levels of pretensioning force imposed on the occupant by the seat belt webbing.

9. The apparatus as set forth in claim 7 wherein said means for venting comprises an actuatable pyrotechnic plug in fluid communication with said fluid chamber.

10. The apparatus as set forth in claim 9 wherein said housing has a vent opening in fluid communication with said fluid chamber, said pyrotechnic plug closing said vent opening prior to being actuated.

11. The apparatus as set forth in claim 7 wherein said housing includes a vent chamber connected in fluid communication with said fluid chamber in said housing by a vent opening.

12. The apparatus as set forth in claim 11 further comprising a diffuser member attached to said housing and covering portions of said housing, said diffuser member having a plurality of diffuser openings which overlie said vent chamber.

13. The apparatus as set forth in claim 7 wherein said controlling means comprises a microcomputer.

14. The apparatus as set forth in claim 7 further comprising sensing means for sensing at least one characteristic of an occupant of the vehicle seat, said sensing means being electronically connected to said controlling means, said controlling means being operable to (i) receive signals from said sensing means indicative of the weight, the height and the position of the occupant, (ii) determine which of said first and second pretensioning output levels for said pretensioning apparatus is appropriate for the occupant, and (iii) actuate at least one of said pyrotechnic device and said means for venting in accordance with the determined appropriate pretensioning output level.

15. The apparatus as set forth in claim 14 wherein said sensing means senses the weight of the occupant and provides a signal to said controlling means indicative of the sensed weight of the occupant.

16. The apparatus as set forth in claim 14 wherein said sensing means senses the height of the occupant and provides a signal to said controlling means indicative of the sensed height of the occupant.

17. The apparatus as set forth in claim 14 wherein said sensing means senses the position of the occupant in the vehicle seat and provides a signal to said controlling means indicative of the sensed position of the occupant.

18. The apparatus as set forth in claim 14 wherein said sensing means includes means for sensing the weight of the occupant, means for sensing the height of the occupant, and means for sensing the position of the occupant in the vehicle seat.

19. An apparatus for pretensioning seat belt webbing which is extensible about an occupant of a vehicle seat, said apparatus comprising:

a housing having a fluid chamber;

an actuatable pyrotechnic device in fluid communication with said fluid chamber;

actuatable venting means for, when actuated, venting fluid from said fluid chamber;

controlling means operatively connected to said pyrotechnic device and to said means for venting for controlling the actuation of said pyrotechnic device and of said means for venting, said controlling means actuating only said pyrotechnic device to provide a first pretensioning output level, said controlling means actuating both said pyrotechnic device and said means for venting to provide a second pretensioning output level; and a piston movable in a cylinder upon actuation of said pyrotechnic device, said housing being attached to said cylinder, said piston having a first position disposed adjacent to said fluid chamber in said housing and being coupled to the seat belt webbing by a coupling member, said coupling member transmitting movement of said piston from the first position into movement of the seat belt webbing to pretension the seat belt webbing in the event of a vehicle collision.

\* \* \* \* \*